US005549837A

United States Patent [19]

Ginder et al.

[11] Patent Number: 5,549,837

[45] Date of Patent: Aug. 27, 1996

[54] MAGNETIC FLUID-BASED MAGNETORHEOLOGICAL FLUIDS

[75] Inventors: John M. Ginder, Plymouth; Larry D. Elie, Ypsilanti; Lloyd C. Davis, Plymouth, all of Mich.

[73] Assignee: Ford Motor Company, Dearborn, Mich.

[21] Appl. No.: 298,714

[22] Filed: Aug. 31, 1994

[51] Int. Cl.[6] .................... C09K 3/00

[52] U.S. Cl. .................... 252/62.52; 252/62.55

[58] Field of Search .................... 252/62.51, 62.55, 252/62.56, 62.52

[56] References Cited

U.S. PATENT DOCUMENTS

| | | | |
|---|---|---|---|
| 2,575,360 | 11/1951 | Rabinow | 192/21.5 |
| 2,661,825 | 12/1953 | Winslow | 192/21.5 |
| 4,100,088 | 7/1978 | Haas et al. | 252/62.52 |
| 4,992,190 | 2/1991 | Shtarkman | 252/62.52 |
| 5,167,850 | 12/1992 | Shtarkman | 252/62.52 |
| 5,382,373 | 1/1995 | Carlson et al. | 252/62.54 |

OTHER PUBLICATIONS

"The Magnetic Fluid Clutch", by Jacob Rabinow, AIEE Transactions, vol. 67, 1948, pp. 1308–1315. no month.

"High Strength Magneto– and Electro–rheological Fluids", by Keith D. Weiss, et al., SAE Technical Paper #932451, 1993 International Off–Highway & Powerplant Congress & Exposition, Milwaukee, Wisconsin, Sep. 13–15, 1993, 6 pages.

"One– and Two–Dimensional Crystallization of Magnetic Holes", by A. T. Skjeltorp, The American Physical Society, Physical Review Letters, vol. 51, No. 25, Dec. 19, 1983, pp. 2306–2309.

"Magnetic Particle Clutches, Brakes, Clutch–Brakes", by Placid Industries, Inc., Lake Placid, NY, 6 pages. No date.

"Ferrofluids, Physical Properties and Applications", Ferrofluidics Corporation, Nashua, NH, 10 pages 1986. No month.

*Primary Examiner*—Melissa Bonner

*Attorney, Agent, or Firm*—Joseph W. Malleck; Roger L. May

[57] ABSTRACT

A magnetorheological fluid composition having a magnetizable carrier medium loaded with magnetizable particles to provide a magnetorheological fluid exhibiting enhanced rheological properties. Also disclosed is a magnetic-particle damper utilizing the magnetorheological fluid composition.

20 Claims, 3 Drawing Sheets

MAGNETIC FLUID-BASED MAGNETORHEOLOGICAL FLUIDS

TECHNICAL FIELD

The present invention relates to a rheological fluid which can be controlled by a magnetic field.

BACKGROUND ART

In the presence of an appropriate electromagnetic field, solid particles in rheological fluids move into alignment. When this alignment occurs, the ability of the fluid to flow, or be sheared, is substantially decreased. In the presence of an energy field rheological fluids respond by forming fibrous structures parallel to the applied field. The formation of these fibrous structures triggers a significant increase in the viscosity of the fluid, by factors as high as $10^5$. This phenomenon has been observed to occur in the presence of both magnetic fields and electrical fields. Hence the terminology "electrorheological fluid" (E.R. fluid) and "magnetorheological fluid" (M.R. fluid).

Electrorheological fluids and magnetorheological fluids comprise a carrier medium, such as a dielectric medium, including mineral oil or silicone oil, and solid particles. Magnetorheological fluids require the use of solid particles that are magnetizable, and electrorheological fluids make use of solid particles responsive to an electric field.

The reversible magnetic-field-induced solidification of slurries of micron-sized magnetizable particles was apparently first reported by Rabinow of the National Bureau of Standards in the late 1940s. Rabinow utilized the controllable rheological properties exhibited by these magnetorheological fluids to construct a series of novel electromechanical clutches.

Prior to that time, Winslow discovered that a similar effect was produced by the application of high electric fields to electrorheological fluids.

These early investigations led to three main discoveries regarding rheological fluids: 1) In the presence of an energy field the particulate matter within the fluid fibrillates and highly elongated condensed structures of particles form parallel to the field; 2) A stress often exponentially related to the field is necessary in order to shear the fluid; consequently, at low shear stresses, the system resembles a solid; 3) At stresses greater than yield stress, the fluid flows like a viscous fluid.

The basis for the magnetorheological effect can be explained by the interparticle force induced by an applied magnetic field. Most M.R. materials are comprised of magnetizable powders—iron, steel, nickel, cobalt, ferrites and garnets—having particle sizes large enough (say 0.1 to 100 micrometers) to incorporate a multiplicity of magnetic domains. As a result, the particles possess little or no permanent magnetic moment but are readily magnetized by an applied magnetic field ($H_o$). The level of magnetic induction B induced in the bulk material is characterized by its relative permeability $\mu_p$ such that $B=\mu_o\mu_pH_o$, where $\mu_o=1.2\times10^{-6}$ H/m is the permeability of free space. The relative permeability is itself a function of the applied field in non-linear materials such as those commonly used in M.R. applications. The initial or low-field permeability of carbonyl iron is commonly reported to be about 100.

When an external magnetic field is applied to an initially random arrangement of magnetizable particles, a magnetic moment (roughly) parallel to the applied field is induced in each particle. The force between two particles whose moments are aligned head-to-tail is attractive, promoting the formation of chains or more complicated networks of nearly contacting particles aligned along the direction of the field. The network of particles so formed is essentially a solid. It can support a shear stress without flowing on laboratory time scales.

The strength of this solid can be characterized by the yield shear stress $\tau_y$, the stress at which the network is disrupted and the particles flow. The yield stress is an important figure-of-merit for device design because, e.g., a high yield stress enables the solidified fluid to sustain larger mechanical forces before flowing. The yield stress is a direct consequence of the interparticle forces and so its order of magnitude can be estimated on the basis of the magnetic forces between the magnetized particles.

One estimates that the yield stress for highly permeable particles is proportional to $\mu_o\mu_fH_o^2$, where $\mu_f$ is the relative permeability of the suspending medium. The relative permeabilities of the various suspending fluids found in the prior M.R. art are all essentially unity.

The ability of these slurries to reversibly solidify in the presence of an energy field offered scientists a controllable mixture for use in the field of servo-mechanisms and other electromechanical applications. Such applications require field-responsive fluids to have very low shear resistance at zero field, high shear stresses at maximum applied field, very low hysteresis, chemical inertness, temperature stability and fast response time.

In contrast to both M.R. fluids and E.R. fluids, ferrofluids are fluids which typically consist of colloidal magnetic particles, such as magnetite and manganese-zinc ferrites, dispersed in a continuous carrier phase. The average particle size of the magnetic particles dispersed in ferrofluids ranges between 5–10 nm.

Upon the application of a magnetic field, colloidal magnetic fluids retain their liquid properties. Due to the effect of Brownian motion on the polarized particles, ferrofluids do not generally exhibit the ability to form particle fibrils or develop a yield stress. On the contrary, ferrofluids experience a body force on the entire fluid which is proportional to the magnetic field's gradient. This force causes ferrofluids to be attracted to regions of high magnetic field strength.

The similarity between M.R. fluids and ferrofluids has caused some confusion in the literature. Ferrofluids are not continuous media, although they often can be treated as such. Rather, they consist of very small (diameters are typically less than 10 nm) single-domain magnetic particles (often magnetite, $Fe_3O_4$) dispersed with the aid of surfactants into various fluid media like water or oils. The particles found in M.R. fluids are orders of magnitude larger in size. Unlike M.R. fluids, ferrofluids do not solidify in an applied field, though they do exhibit field-induced viscosity increases. See, e.g. J. P. McTague, *J. CHEM. PHYS.* 51, 133 (1969). Ferrofluids do experience body forces in homogeneous magnetic fields, allowing their position to be manipulated, thus enabling the construction of ferrofluid devices like rotary seals and vacuum feedthroughs.

Electrorheological fluids (E.R. fluids) have in application presented a variety of problems. For example, E.R. fluids exhibit low yield strength and temperature sensitivity, which thereby severely limits their use in most applications. Furthermore, the inability of E.R. fluids to withstand water contamination has posed a serious issue in terms of compatible applications. Lastly, a large scale application of E.R. fluid systems requires high voltage power supplies which are both potentially dangerous and expensive. Despite these problems, the need for a controllable mixture has led scientists to use E.R. fluids in shock absorbers, clutches, engine mounts, and active bushings.

Magnetorheological fluids (M.R. fluids) offer a similarly controllable mixture having almost none of the problems associated with E.R. fluids. M.R. fluids generally consist of micron-sized, magnetically polarizable particles dispersed in a carrier medium. The formation of fibrous structures upon the application of a magnetic field is essential to the operation of a M.R. fluid. In the presence of a shear force, the equilibrium that is established between the formation and breaking of particle fibrils determining the yield strength for the fluid.

An important technical measure of magnetorheological fluid is its yield stress. Yield stress is defined as the applied stress required for the fibrils to flow or 'yield'; it generally increases with an increase in the energy field strength. Accordingly, yield stress defines the onset of flow.

Notably, the yield stress values generated by M.R. fluids are significantly greater than those measured for their E.R. fluid counterparts. In fact, yield stress values in excess of 80 kPa are easily obtainable for M.R. fluids in the presence of a magnetic field. As a comparison, while yield stress values for M.R. fluids are typically 100 kPa, yield stresses of E.R. fluids are 10 kPa at best.

An additional advantage of M.R. fluids over E.R. fluids exists in the ability of M.R. fluids to operate over a broad temperature range. M.R. fluids are reported to function effectively throughout the temperature range of –40 to 150° Celsius. Over this 190° range, only a small variation in the yield strength of the M.R. fluid can be observed.

Lastly, M.R. fluids can utilize low voltage, current-driven power supplies, which currently exist for large volume applications at a relatively low cost.

Thus, the main advantages associated with M.R. fluids over E.R. fluids include the ability to obtain very high yield stress values, the compatibility of M.R. fluids to low voltage, current-driven power supplies available in large volumes and a reduced sensitivity to the presence of low level contaminants. Additionally, M.R. fluids respond to the application of a magnetic field on the order of milliseconds.

Devices using rheological fluids may be simpler and more reliable than electromechanical devices due to the reduction of moving parts necessary. These fluids offer an efficient means to interface mechanical components with an electrical control system. Thus, rheological fluids have been used for controllable dampers, mounts, clutches, and brakes through the rapid response of these fluids to changes in their applied field.

A publication entitled "Magnetorheological Effect For Non-Magnetic Particles Suspended In A Magnetic Liquid" by Kashevskii et al., (1989) discusses the rheology of "magnetic hold" suspensions. The publication discusses the combination of nonmagnetic, non-colloidal particles with a magnetic liquid and the resultant magneto-rheological effect. There is no suggestion of a magnetic fluid composition comprising magnetizable particles in a magnetizable liquid.

DISCLOSURE OF THE INVENTION

The present invention describes a magnetorheological fluid composition including a magnetizable carrier fluid having suspended therein magnetizable particles.

Like most M.R. fluids known in the prior art, the present material contains magnetizable particles at high loading levels. However, while most known M.R. materials utilize a substantially nonmagnetic carrier fluid, for example, mineral oil or silicone oil, the present invention employs a magnetizable carrier fluid, such as a ferrofluid, to obtain a synergistic rheological effect.

The use of a magnetizable carrier medium enhances the force between magnetizable particles and thus increases the stiffness and viscosity of the M.R. fluid. This increased force can allow a decrease in package size and weight of a device (for example, clutch or damper) without reducing the generated torques or forces. Magnetorheological fluids can possess low-field permeabilities larger by a factor of five or more than their non-magnetorheological fluid counterparts. The enhanced permeabilities of these suspending media are a major cause of the enhanced rheological properties of M.R. materials based on the use of a magnetic carrier fluid.

It is an object of the present invention to provide an improved M.R. fluid composition that is highly responsive to a magnetic field.

It is also an object of this invention to improve the rheological properties of a M.R. fluid in the presence of a magnetic force.

It is additionally an object of this invention to increase the torque or force capable of being generated by an electromechanical device comprising said M.R. fluid composition.

It is a further object of this invention to provide a M.R. fluid which can be readily positioned and manipulated to meet specific application requirements.

The above objects and other objects, features and advantages of the present invention are readily apparent from the detailed description of the best mode for carrying out the invention when taken in conjunction with the accompanying drawings.

BEST MODE FOR CARRYING OUT THE INVENTION

Figure 1:
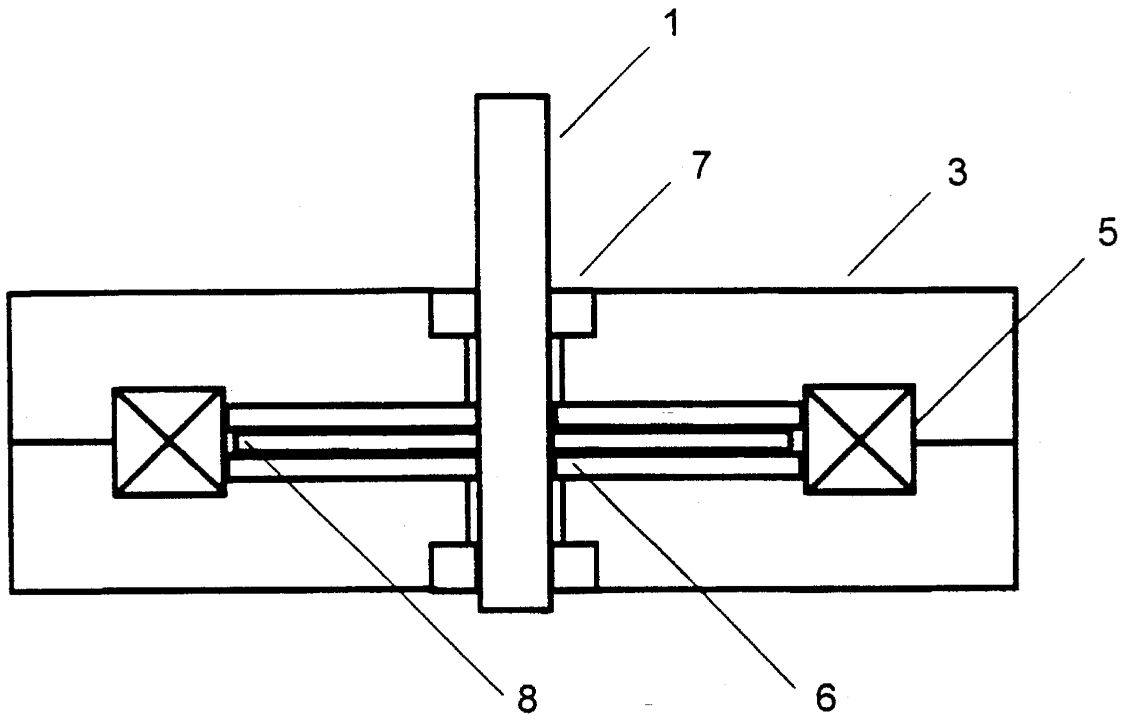
FIG. 1 is a view of a magnetic-particle brake assembly which uses a rheological fluid in accordance with the present invention.

The M.R. fluid composition of the present invention comprises a magnetizable carrier fluid; and a multiplicity of magnetizable particles loaded within said magnetizable carrier fluid. Preferably, the magnetic fluid composition of the present invention uses a ferrofluid carrier medium.

The concentration of magnetizable particles loaded within the magnetizable carrier fluid ultimately depends on the fluid properties required for a given application. However, typical volume concentrations range from 5% to 60%, with 50% being nominal. Although higher concentrations result in larger field-induced shear stresses this occurs at the cost of higher viscosities.

Generally applications require as low a viscosity as possible. Magnetorheological fluids exhibit off-state viscosities in the range of 0.20 to 0.30 Pa-sec at 25° C. It is possible to decrease the ferrofluid viscosity by changing the composition of the base fluid, but only a few base fluid systems are available. An alternative way to decrease the viscosity of the M.R. fluid is to reduce the volume fraction of single-magnetic-domain particles in the ferrofluid. A disadvantage of this technique is the accompanying reduction in the magnetic properties of the magnetizable carrier fluid.

Preferably, yield stress values should be as large as possible. While yield stresses of E.R. fluids are 10 kPa at best, M.R. fluid yield stresses are typically 100 kPa. In fact as later discussed one of the M.R. fluids prepared had an estimated yield stress of 250 kPa.

In addition, to minimize the effects of sedimentation, it is preferable to match the densities of the magnetic particles and the magnetizable carrier fluid. Ways to achieve such a matching include using hollow magnetizable particles or coating nearly density-matched particles (such as a polymer or hollow glass particles) with thin layers of magnetic material. This coating could be applied by evaporation or by electroless chemical techniques. Other ways to inhibit sedimentation include making the suspending medium thixotropic, i.e., a weak solid that holds the suspended particles in place but that flows readily when a shear stress is applied.

It is believed that the properties of magnetizable particles should have relatively little dependence on particle size so long as the particles are large enough for the magnetic forces to overcome Brownian motion. Brownian motion requires the particles to be greater than approximately 10 nm. The maximum particle size is limited primarily by the dimensions of the gap in the device that uses the fluid, approximately 0.1 mm. Within this range, particles between 1–10 microns are widely available commercially. It is further believed that cylindrical or spherical particles could lead to substantially enhanced shear stresses of the M.R. fluid composition.

Additionally, it is preferred that the M.R. fluid have as large an initial magnetic susceptibility as possible. Initial susceptibility range from 1 (nonmagnetic) to as high as sometimes 10. Another factor, however is the saturation magnetization of the ferrofluid-based M.R. fluid. Both initial magnetic susceptibilities and saturation magnetization play a role in characterizing ferrofluid-based M.R. fluids.

The following materials are appropriate magnetizable particles: iron, steel, cobalt, nickel, ferrites and other garnets. Alloys of the above materials are also suitable magnetizable particles. In fact, an alloy of iron and cobalt in a roughly 65:35 ratio has a significantly large saturation magnetization.

Preparation of a ferrofluid-based M.R. fluid began with 48 grams of a carbonyl iron powder having an average particle size of 6 microns and an assumed mass density of 8 grams per cc, that of bulk iron. The iron powder was mixed by stirring and shaking into 7.4 grams of a light-mineral-oil-based ferrofluid (ferrofluid type EMG 905 from Ferrofluidics Corporation, Nashua, N.H.), having a density of 1.24 grams per cc, an average particle size of 10 nm and an initial permeability of 2.9. Notably, the masses of iron and ferrofluid were chosen so that the volume fraction of particles in the M.R. fluid was nominally 0.5.

EXPERIMENTAL

For purposes of comparison, a conventional M.R. fluid incorporating a non-magnetic suspending medium was also prepared. 48 grams of carbonyl iron was mixed into 5 grams of a light mineral oil having a density of 0.84 grams per cc to yield a nominal particle volume fraction of 0.5. Roughly 0.2 grams of a surfactant was added to this mixture to aid the dispersion of the iron particles.

A magnetic particle brake assembly purchased commercially (Placid Industries B-35) was adapted to test these MR fluids. A schematic cross-sectional view of the brake is shown in FIG. 1; the flow of electrical current in the coil (5) causes a substantial magnetic field to be generated across the two gaps between the ferrous brake housing (3) and a circular disk (8) at its center. The disc (8) is affixed to a freely-rotating nonmagnetic shaft (1) which provides a mechanical connection to rotating machinery or other devices; the shaft (1) is rotatably supported by a pair of bearings (7). When an MR fluid (6) in the gap is magnetized, the resulting solid network mechanically couples the disc (8) and shaft (1) to the body of the brake; a non-zero torque is required to overcome this coupling and rotate the disc. The torque level was measured for a series of applied voltages using a torque wrench; the data obtained with the supplier's original magnetic powder (a steel powder according to the supplier) are shown in FIG. 2.

Figure 2:
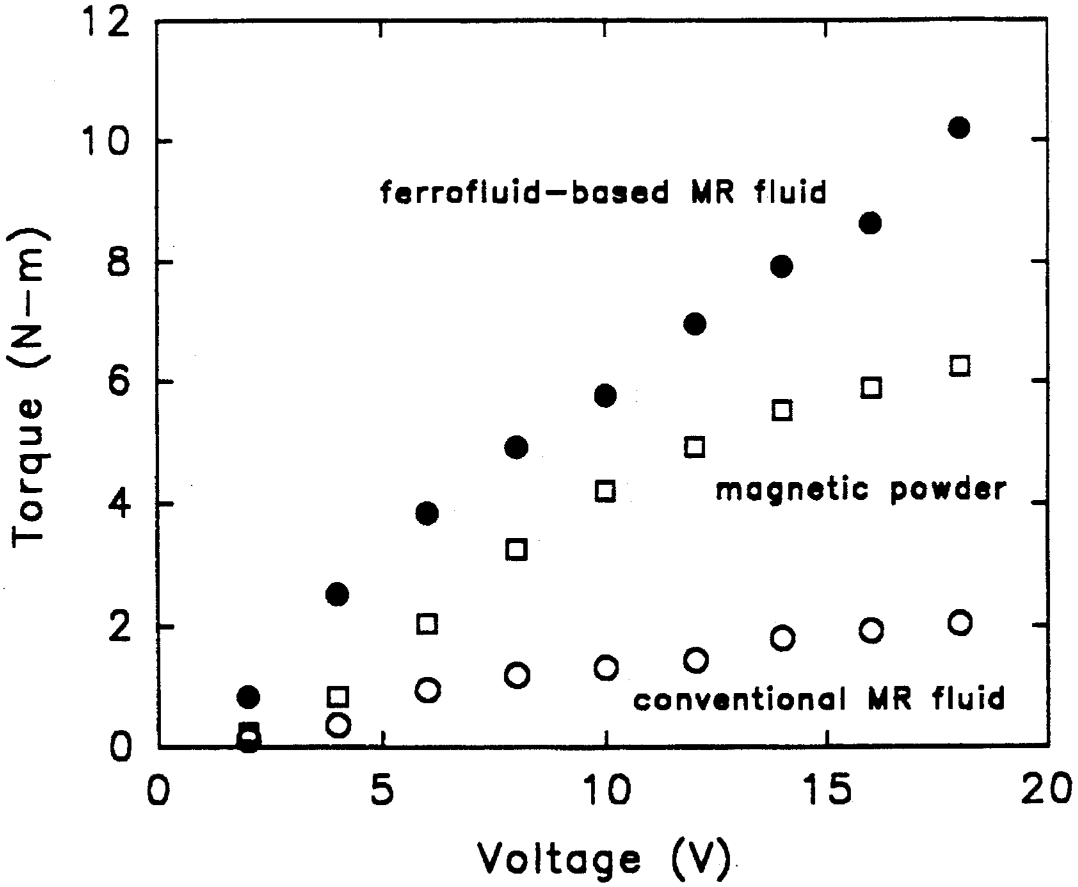
FIG. 2 is a graph illustrating operational differences between conventional M.R. fluid, magnetic powder, composition fluid and ferrofluid-based M.R. fluids.

Also shown in FIG. 2 are data for the conventional MR fluid and the ferrofluid-based MR fluid described above. The largest torque measured with the ferrofluid-based MR fluid, 10.2 N-m, is consistent with a remarkable fluid-induced shear stress of over 200 kPa. It is seen that the ferrofluid-based MR fluid outperforms both the conventional MR fluid and the MR powder at all voltage (current) levels, consistent with the low-field enhancement expected because the initial ferrofluid permeability is greater than 1.

The comparison between the ferrofluid-based and the mineral-oil based MR fluids is particularly relevant, since these fluids contain the same volume fraction and species of magnetizable particles; the torques obtained with the ferrofluid-based MR fluid are at least a factor of four larger than with the conventional fluid. Other possible origins of the enhancements seen with the ferrofluid-based material include local increases in the suspending fluid permeability and/or viscosity in the gaps between magnetizable particles induced by local field enhancements.

The magnetic field-induced torques measured with the brake containing the same batch of ferrofluid-based MR fluid have remained virtually unchanged over the four weeks since the initial tests. Apparently the deleterious effects of particle sedimentation are reduced, perhaps by forces produced by non-zero remanent magnetization of the MR fluid or the brake body. Indeed, some hysteresis was observed in the torque when reversing the direction of the applied magnetic field, suggesting that remanent magnetization does play a role.

Other issues in the long-term stability of ferrofluid-based MR fluid devices include the compatibility of the fluid with any elastomeric seals that may be present. Proper choice of the base fluid for the ferrofluid (e.g., silicones, which do not swell most rubber seals) may alleviate such problems. Alternatively, magnetic seals akin to those used in pure ferrofluid seals may be constructed in MR devices if the resulting increase in drag torque is tolerable.

The foremost advantage of these ferrofluid-based MR fluids over conventional MR materials is the enhanced field-induced stresses that they exhibit, permitting larger forces or torques to be generated in damper or clutch devices for a given device size and weight. A secondary advantage is the reduction in the rate of sedimentation or centrifugation of the dispersed magnetizable particles, since ferrofluids have higher densities and viscosities than the pure base fluid from which they are produced.

As a result of their generally zero-field viscosities these ferrofluid-based M.R. fluids are perhaps best suited for rotary or linear damping devices in which low shear rates are involved. Such potential linear dampers include automotive shock absorbers and cab mounts. Moreover, because of the decreased sedimentation rate of the ferrofluid-based M.R. fluid mixtures, they could have particularly long shelf lives that might make these mixtures well suited for semiactive earthquake dampers for buildings.

These magnetic fluid based-magnetorheological fluids offer an efficient means to provide controllable devices which are feasible in a variety of applications. As mentioned above, such applications include magnet-particle clutches, magnet-particle brake assemblies, and magnet-particle dampers.

One embodiment of a magnetic-particle clutch includes: a shaft assembly having a pair of rotatable shafts, the first rotatable shaft is a drive shaft and the second rotatable shaft is a driven shaft; a pair of discs separated by a space, the pair of discs coupled to the pair of shafts and a magnetorheological fluid composition located in the space between the pair of discs. The magnetic fluid composition consists of a magnetizable carrier fluid; and a multiplicity of magnetizable particles suspended within the magnetizable carrier fluid; and means for generating a magnetic field positioned between the pair of discs such that when a magnetic field is applied the pair of discs are connected by the magnetic fluid compositions to allow the transmission of a torque between the drive shaft and the driven shaft.

One embodiment of a magnetic-particle brake assembly, includes a shaft assembly having a pair of shafts, a first rotating shaft and a second fixed shaft; a pair of discs coupled to the shafts, wherein the pair of disks are separated by a space; a magnetic fluid composition located in the space between the pair of discs, wherein the magnetic fluid composition has a magnetizable carrier fluid; and a multiplicity of magnetizable particles suspended within magnetizable carrier fluids; and means for generating a magnetic fluid positioned near the pair of discs such that when a magnetic field supplies the pair of disks are connected by the magnetic fluid composition so as to allow the transmission of a retarding torque which exerts a braking action on the rotating shaft.

Figure 3:
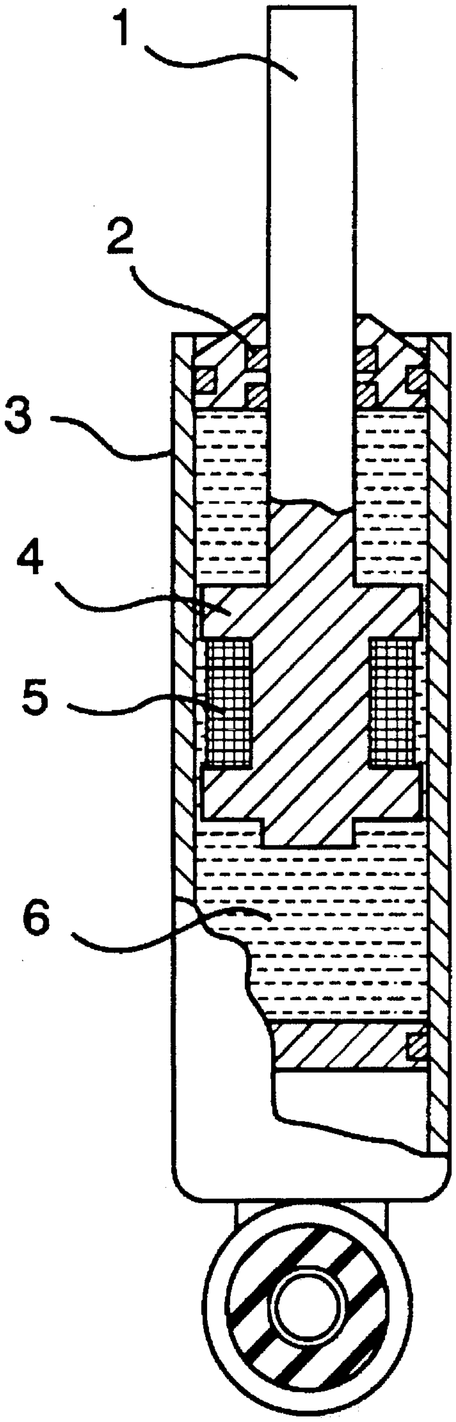
FIG. 3 is a view of magnetic-particle damper which uses a rheological fluid in accordance with the present invention.

Additionally, one embodiment of a magnetic-particle damper, as shown in FIG. 3, includes: a housing (3); a piston located within the housing (4); a magnetic fluid composition located within the housing and positioned to be in contact with the piston (6), the fluid composition has a magnetizable carrier fluid and a multiplicity of magnetizable particles located within the magnetizable carrier fluid; means for generating a magnetic field positioned near the magnetic fluid composition such that when a magnetic field is supplied the piston is connected to the magnetic fluid composition so as to allow the transmission of a retarding torque to exert a braking action on the piston (5); a shaft coupled to the piston so as to transmit the braking action (1) and a plurality of seals matingly engaged to the housing to prevent leakage of the magnetic fluid composition (2).

While the best mode for carrying out the invention has been described in detail, those familiar with the art to which this invention relates will recognize various alternative designs and embodiments for practicing the invention as defined by the following claims.

We claim:

1. A magnetorheological fluid composition, comprising:

a magnetizable carrier fluid; and a multiplicity of magnetizable particles, each having substantially spheroidal shape, said magnetizable particles being suspended within said magnetizable carrier fluid to provide a fluid which exhibits magnetorheological properties.

2. The fluid composition of claim 1, wherein said magnetizable carrier fluid is a ferrofluid.

3. The fluid composition of claim 1, wherein said magnetizable carrier fluid and said multiplicity of magnetizable particles have similar densities so as to minimize sedimentation of said magnetizable particle from said carrier fluid within the magnetorheological fluid composition.

4. The fluid composition of claim 1, wherein said magnetizable carrier fluid is thixotropic to substantially reduce sedimentation of said magnetizable particles.

5. The fluid composition of claim 1, wherein said magnetizable particles are hollow.

6. The fluid composition of claim 1, wherein said magnetizable particles are coated with thin layers of magnetic material.

7. The fluid composition of claim 1, wherein said magnetizable particles are selected from the group consisting of iron, steel, cobalt, nickel, ferrite, garnet and alloys thereof.

8. The fluid composition of claim 1, wherein said magnetizable particles have an average particle size in the range of 100 nm to 0.1 mm.

9. The fluid composition of claim 1, wherein said magnetizable particles have a cylindrical shape to enhance shear stresses of the magnetorheological fluid composition.

10. The fluid composition of claim 1, wherein the fluid composition has a viscosity below 0.30 Pa-sec at 25° C.

11. The fluid composition of claim 1, wherein said magnetizable particles suspended with said magnetizable carrier fluid have a volume concentration in the range of approximately 5% to 60%.

12. A magnetorheoheological fluid composition, comprising:

a ferrofluid carrier fluid; and a multiplicity of magnetizable particles, each having a substantially spheroidal shape, said magnetizable particles being suspended in said ferrofluid carrier fluid to provide a fluid which exhibits magnetorheological properties.

13. The fluid composition of claim 12, wherein said ferrofluid has a density of about 1.24 g/cc.

14. The fluid composition of claim 12, wherein said ferrofluid has an average particle size of about 10 nm.

15. The fluid composition of claim 12, wherein said ferrofluid has an initial permeability of about 2.9.

16. The fluid composition of claim 12, wherein said magnetizable particles have a volume fraction of about 0.5.

17. The fluid composition of claim 12, wherein said magnetizable particles comprise carbonyl iron powder.

18. The fluid composition of claim 17, wherein said carbonyl iron powder has an average particle size of about 6 microns.

19. The fluid composition of claim 17, wherein said carbonyl iron powder has a mass density of about 8 g/cc.

20. A magnetic-particle damper, comprising:

a housing;

a piston located within said housing;

a magnetorheological fluid composition located within said housing and positioned to be in mating contact with said piston, wherein said magnetorheological fluid composition comprises:

a magnetizable carrier fluid; and a multiplicity of magnetizable particles suspended in said magnetizable carrier fluid;

means for generating a magnetic field positioned near said magnetorheological fluid composition; and a shaft coupled to said piston, positioned to extend from said housing.

* * * * *